3,079,425
SYNTHESIS OF NITRATE ESTERS

George A. Mortimer, La Marque, Tex., assignor to Monsanto Chemical Company, St. Louis, Mo., a corporation of Delaware
No Drawing. Filed July 20, 1961, Ser. No. 125,378
12 Claims. (Cl. 260—467)

The present invention relates to the preparation of alkyl nitrates and more particularly to an improved method for preparing said nitrates from alkyl chloroformates.

The method of preparing nitrate esters from the corresponding chloroformates has been described by Boshchan in J. Am. Chem. Soc., 81, 3341 (1959). The reaction in general, however, is slow and yields in many cases are low. It has now been discovered that if this reaction is carried out in the presence of amine catalysts, reaction rates are appreciably increased and substantially quantitative yields are obtained.

According to the invention, alkyl nitrates are produced by reacting alkyl chloroformates in a solvent medium with a nitrate salt having a cation which will precipitate chlorine practically quantitatively from the solvent in the presence of an amine catalyst chosen from the group consisting of tertiary alkyl amines, alkyl aromatic amines, and heterocyclic amines. Suitable catalysts include, for example, triethyl amine, trimethyl amine, tripropyl amine, dimethyl aniline, pyridine, quinoline, isoquinoline, and the like. The catalyst is employed in amounts from about 1% to about 30% by weight of the chloroformate. However, the preferred amounts to be employed are in the range from about 5 to about 15%.

Nitrate salts suitable for reacting with the alkyl chloroformates include metallic nitrates such as those of silver, copper, mercury, and lead and ammonium nitrate, with silver nitrate being the preferred reactant.

Any organic solvent which will serve as an adequate carrier for the reactants and does not react with them can be employed as the reaction medium. For practical purposes, those solvents in which the nitrate salts are somewhat soluble are preferred, but it is not necessary that the salts be completely soluble in the solvent. Examples of solvents useful in the process of the invention include acetonitrile, benzene, toluene, dioxane, carbon tetrachloride, and the like. The preferred solvent is acetonitrile.

Temperatures may be varied considerably. The reaction occurs in two steps. The first step results in the formation of an alkyl nitratocarbonate. In the second step, the nitratocarbonate is decomposed to yield the alkyl nitrate and carbon dioxide. The first step may be conducted at temperatures as low as $-30°$ C. and at temperatures below $15°$ C. results in the formation of the nitratocarbonate without any appreciable decomposition. At temperatures from $15°$ C. upward, decomposition of the intermediate sets in as soon as it is formed and this reaction may be conducted at temperatures as high as $150°$ C. Preferably, the reaction is conducted by carrying out the first step at temperatures in the range from about $-20°$ C. to about $15°$ C. with a gradual warmup in the reaction mixture after the salt is precipitated therefrom, employing temperatures anywhere in the range from $15°$ C. to $150°$ C.

The invention is illustrated in the following examples which, however, are not to be construed as limiting it in any manner whatsoever.

Example 1

The reaction vessel employed was a 200-ml., three-necked flask fitted with a stirrer, a gas entry tube and a water-cooled condenser attached to a gas train consisting of a Dry-Ice trap, an Ascarite tube and a mineral oil bubbler vented to the atmosphere. The flask was submerged in a constant temperature bath and charged with 22.60 g. (0.133 mole) of silver nitrate and 75 ml. of acetonitrile. The stirrer was started and argon was passed through the system overnight. The bath was then heated to $40.0°\pm0.3°$ C. and 15.0 ml. (0.133 mole) of n-propyl chloroformate was pipetted into the flask. The reaction began immediately and was allowed to proceed for about 28 hours. At the end of that time, the reaction mixture was filtered. The silver chloride precipitate was washed with a little acetonitrile, then triturated well with dichloromethane and dried by suction prior to drying in a vacuum oven at $80°$ C. to give 16.94 g. or 89% of the theoretical possible in the reaction. A sample of the supernatant liquid prior to filtration was analyzed on a gas chromatograph and found to consist essentially of acetonitrile, n-propyl nitrate and unreacted n-propyl chloroformate.

Example 2

The reaction of Example 1 was run at room temperature ($25°$ C.) using the same proportions of reactants but with the exception that 2 ml. of pyridine was added after the chloroformate was charged. Even before addition of the pyridine could be completed, an extremely vigorous evolution of gas occurred and a copious precipitation of silver chloride took place. Although reaction appeared to be complete in about 5 minutes, the reaction mixture was stirred for one hour. At the end of that time, the supernatant liquid of the mixture was analyzed using the gas chromatograph. No chloroformate remained and all of the product except about 10% indicated to be n-propanol was n-propyl nitrate.

Example 3

The reaction of n-propyl chloroformate and silver nitrate was carried out exactly as in Example 1 except that the reaction temperature was maintained at $-10°\pm5°$ C. by means of a cooling bath. The reaction was terminated after 48.5 hours by suction filtration of the reaction mixture in the cold. The silver chloride precipitate after washing and drying as in Example 1 amounted to about 10.9% of the theoretical possible. The combined filtrate and washings were flash distilled in the cold at 25 mm. Hg. An analysis of the distillate at $100°$ C. on the gas chromatograph showed it to be essentially the same product as that obtained in Example 1, i.e., a mixture consisting essentially of acetonitrile, n-propyl nitrate, and unreacted n-propyl chloroformate. Only about 10% of the n-propyl chloroformate charged had been consumed. The distillate was then subjected to further distillation in a 40-cm. Vigreaux column and several fractions were collected after the solvent was removed. The vapor chromatographs of the fractions analyzed were identical to that of the distillation feed.

Example 4

The reaction of Example 3 was repeated except that 2.0 ml. of pyridine was added to the reaction mixture. Temperature was controlled at $-17°\pm2°$ C. After a total reaction period of 3 hours which included the hour required for introducing the n-propyl chloroformate, an aliquot of the reaction mixture liquid was withdrawn and analyzed at $100°$ C. on a gas chromatograph. Again, the same major constituents were found to be present, the acetonitrile solvent, n-propyl nitrate, and unreacted n-propyl chloroformate, the amount of the latter indicating that 60% of this starting material had been consumed. The Ascarite tube showed no weight gain indicating that n-propyl nitratocarbonate was not decomposing in the reaction mixture, although it did decompose to carbon dioxide and n-propyl nitrate when chromatographed.

The reaction mixture was allowed to warm to room temperature overnight. A vapor chromatogram of the reaction mixture then showed in addition to the acetonitrile band only a single peak corresponding to n-propyl nitrate. The n-propyl chloroformate had been converted essentially quantitatively to the corresponding alkyl nitrate.

*Example 5*

Triethyl amine was employed as a catalyst in this experiment. The reaction paralleled that of Example 1 in all respects except that 2.0 ml. of triethyl amine was added with the reactants and the reaction temperature was somewhat lower, being controlled at about 32° C. Samples were withdrawn after reaction periods of 5 and 30 minutes, respectively, and subjected to analysis in a gas chromatograph. The same products were obtained as were obtained in Example 1 but at an accelerated rate of reaction.

What is claimed is:

1. An improved process for the production of alkyl nitrates which comprises reacting an alkyl chloroformate and silver nitrate in a solvent medium in the presence of a tertiary amine chosen from the group consisting of heterocyclic amines, alkyl amines and alkyl aromatic amines at temperature in the range from about 15° C. to about 150° C.

2. The process of claim 1 wherein said solvent medium is acetonitrile.

3. The process of claim 1 wherein said amine is present in an amount from about 1% to about 30% by weight of said chloroformate.

4. The process of claim 2 wherein said amine is pyridine.

5. The process of claim 2 wherein said amine is triethyl amine.

6. An improved process for the production of n-propyl nitrate which comprises reacting n-propyl chloroformate and silver nitrate in acetonitrile as a solvent medium in the presence of pyridine in an amount from about 5% to about 15% by weight of the chloroformate at a temperature in the range from about 15° C. to about 150° C.

7. An improved process for the production of alkyl nitrates which comprises reacting an alkyl chloroformate and silver nitrate in a solvent medium in the presence of a tertiary amine chosen from the group consisting of heterocyclic amines, alkyl amines and alkyl aromatic amines at a temperature in the range from about −20° C. to about 15° C. and thereafter heating said reaction mixture to a temperature in the range from about 15° C. to about 150° C.

8. The process of claim 7 wherein said solvent medium is acetonitrile.

9. The process of claim 7 wherein said amine is present in an amount from about 1% to about 30% by weight of said chloroformate.

10. The process of claim 8 wherein said amine is pyridine.

11. The process of claim 8 wherein said amine is triethyl amine.

12. An improved process for the production of n-propyl nitrate which comprises reacting n-propyl chloroformate and silver nitrate in acetonitrile as a solvent medium in the presence of pyridine in an amount from about 5% to about 15% by weight of the chloroformate at a temperature in the range from about −20° C. to about 15° C. and thereafter heating said reaction mixture to a temperature in the range from about 15° C. to about 150° C.

References Cited in the file of this patent

Boshchan: J. Am. Chem. Soc., 81, 3341 (1959).
Vona et al.: J. Am. Chem. Soc., 81, 1095–9 (1959)